US009119133B2

(12) United States Patent
Ulupinar et al.

(10) Patent No.: US 9,119,133 B2
(45) Date of Patent: Aug. 25, 2015

(54) LOCAL INTERNET PROTOCOL ACCESS CAPABILITY INDICATION

(75) Inventors: Fatih Ulupinar, San Diego, CA (US); Gavin Bernard Horn, La Jolla, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 12/773,308

(22) Filed: May 4, 2010

(65) Prior Publication Data
US 2010/0284386 A1 Nov. 11, 2010

Related U.S. Application Data

(60) Provisional application No. 61/176,549, filed on May 8, 2009.

(51) Int. Cl.
| H04W 88/08 | (2009.01) |
| H04W 48/12 | (2009.01) |
| H04W 8/08 | (2009.01) |
| H04W 84/04 | (2009.01) |

(52) U.S. Cl.
CPC .............. *H04W 48/12* (2013.01); *H04W 8/082* (2013.01); *H04W 84/045* (2013.01)

(58) Field of Classification Search
CPC .... H04W 48/12; H04W 8/082; H04W 84/045
USPC .......... 370/338, 335, 310, 313, 328; 709/249, 709/238, 217
See application file for complete search history.

(56) References Cited

U.S. PATENT DOCUMENTS

| 5,229,995 | A | * | 7/1993 | Strawczynski et al. ....... 370/280 |
| 5,878,036 | A | * | 3/1999 | Spartz et al. .................. 370/335 |
| 2005/0286478 | A1 | * | 12/2005 | Mela et al. ..................... 370/338 |
| 2008/0194224 | A1 | * | 8/2008 | Thorson et al. ............ 455/404.1 |
| 2008/0285492 | A1 | * | 11/2008 | Vesterinen ..................... 370/310 |
| 2010/0020779 | A1 | * | 1/2010 | Kalhan et al. ................. 370/338 |
| 2010/0195621 | A1 | * | 8/2010 | Kekki et al. .................. 370/332 |
| 2010/0284299 | A1 | * | 11/2010 | Bi et al. ......................... 370/253 |
| 2012/0069776 | A1 | * | 3/2012 | Caldwell et al. .............. 370/271 |

FOREIGN PATENT DOCUMENTS

| CN | 101218842 A | 7/2008 |
| JP | 2004364054 A | 12/2004 |
| WO | WO 2008125729 A1 * | 10/2008 |

OTHER PUBLICATIONS

3rd Generation Partnership Project TSG SA WG2 Meeting #72; "Architecture alternative for Local IP access", NEC, Mar. 30-Apr. 3, 2009, NEC, pp. 1-5.*

(Continued)

*Primary Examiner* — Rasheed Gidado
(74) *Attorney, Agent, or Firm* — François A. Pelaez

(57) ABSTRACT

Aspects describe indicating to a mobile station whether an access point supports local Internet Protocol (IP) access. The indication can be sent through utilization of common signaling, which allows the mobile station to have information about the local IP access availability before connecting to the access point. The indication can be sent through utilization of dedicated signaling, which allows the mobile station to find out about availability of local IP access after the mobile station connects to the access point.

64 Claims, 10 Drawing Sheets

(56) References Cited

OTHER PUBLICATIONS

3rd Generation Partnership Project TSG SA WG2 Meeting #72; "Local IP access baseline solution for EHNB" Qualcomm Europe; Mar. 30-Apr. 3, 2009, pp. 1-6.*

3rd Generation Partnership Project; Technical Specification Group Radio Access Network; UTRAN architecture for 3G Home NodeB; Stage 2 (Release 8) 3GPP Standard; 3GPP TS 25.467, 3rd Generation Partnership Project (3GPP), Mobile Competence Centre ; 650, Route Des Lucioles ; F-06921 Sophia-Antipolis Cedex ; France, no. V8.1.0, Mar. 1, 2009, pp. 1-26, XP050369092.

3rd Generation Partnership Project; Technical Specification Group Services and System Aspects; Local IP Access and Selected IP Traffic Offload (Release 10) 3GPP Standard; 3GPP 23.829, 3rd Generation Partnership Project (3GPP), Mobile Competence Centre ; 650, Route Des Lucioles ; F-06921 Sophia-Antipolis Cedex ; France, no. V1.0.1, Mar. 24, 2010, pp. 1-37, XP050402025 [retrieved on Mar. 24, 2010].

International Search Report and Written Opinion—PCT/US2010/034135, International Search Authority—European Patent Office—Aug. 11, 2010.

Taiwan Search Report—TW099114694—TIPO—Feb. 22, 2013.

* cited by examiner

LOCAL INTERNET PROTOCOL ACCESS CAPABILITY INDICATION

CROSS-REFERENCE

This is an application claiming priority to Provisional Application No. 61/176,649 entitled "METHOD AND APPARATUS FOR LOCAL IP ACCESS CAPABILITY INDICATION" filed May 8, 2009, and assigned to the assignee hereof and hereby expressly incorporated by reference herein.

BACKGROUND

I. Field

The following description relates generally to wireless communications and more particularly to local Internet Protocol access.

II. Background

Wireless communication systems are widely deployed to provide various types of communication content, such as voice, data, video, and so forth, and to communicate information regardless of where a user is located (e.g., inside or outside a structure) and whether a user is stationary or moving (e.g., in a vehicle, walking). These systems may be multiple-access systems capable of supporting communication with multiple users by sharing the available systems resources (e.g., bandwidth and transmit power). Multiple-access systems include Frequency Division Multiple Access (FDMA) systems, Time Division Multiple Access (TDMA) systems, Code Division Multiple Access (CDMA) systems, Orthogonal Frequency Division Multiple Access (OFDMA) systems, Third Generation Partnership Project (3GPP) Long Term Evolution (LTE) systems, and others.

Generally, wireless multiple-access communication systems can simultaneously support communication for multiple mobile devices. Each mobile device can communicate with one or more base stations through transmissions on forward and reverse links. The forward link (or downlink) refers to the communication link from base stations to mobile devices. The reverse link (or uplink) refers to the communication link from mobile devices to base stations. These communication links can be established through single-input-single-output (SISO) systems, multiple-input-single-output (MISO) systems, multiple-input-multiple-output (MIMO) systems, and so forth. In addition, mobile devices can communicate with other mobile devices (and/or base stations with other base stations) in peer-to-peer wireless network configurations.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB), Home eNode Bs (HeNBs), or femto cells. Typically, such miniature base stations are connected to the Internet and the mobile operator's network through a Digital Subscriber Line (DSL) router or cable modem.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with local Internet Protocol (IP) capability indication. An aspect relates to a method for indicating whether an access point provides local Internet Protocol (IP) access. Method comprises determining that local IP access connectivity is available at access point and notifying a mobile device through use of common signaling that local IP access connectivity is available at access point.

An aspect relates to a wireless communications apparatus comprising a memory and a processor. Memory retains instructions related to ascertaining that local IP access connectivity is available at wireless communications apparatus and sending a notification through common signaling that local IP access connectivity is available. Processor is coupled to memory and is configured to execute instructions retained in memory.

Another aspect relates to a wireless communications apparatus that indicates availability of local Internet Protocol (IP) access. Wireless communications apparatus comprises means for deciding local IP access connectivity is available at wireless communications apparatus and means for using common signaling to convey an availability of local IP access connectivity at wireless communications apparatus. Wireless communications apparatus can also comprise means for advertising on an overhead channel an indication of local IP access connectivity. Overhead channel comprises system information blocks and an indication is a bit that indicates availability of local IP access connectivity.

A further aspect relates to a computer program product comprising a computer-readable medium. Included in computer-readable medium are a first set of codes for causing a computer to determine local IP access connectivity is available for a mobile device and a second set of codes for causing computer to use common signaling to send to mobile device an indication that local IP access connectivity is available. First set of codes can receive a configuration from a network entity that indicates whether to provide local IP access connectivity to mobile device or can receive an indication that local IP access connectivity is allowed for mobile device.

An aspect relates to at least one processor configured to indicate whether local Internet Protocol (IP) access is available. Processor comprises a first module that receives from a network entity a configuration that indicates whether to provide local IP access connectivity or an indication that local IP access connectivity is allowed for a mobile device. Processor also comprises a second module that ascertains local IP access connectivity is available as a function of the configuration or the indication and a third module that conveys over common signaling a notification that local IP access connectivity is available.

Another aspect relates to a method for indicating whether an access point provides local Internet Protocol (IP) access connectivity. Method comprises receiving from a mobile device a request to establish a connection to access point and determining access point is able to provide local IP access connectivity. Method also comprises notifying mobile device through use of dedicated signaling that local IP access connectivity is available at access point. In accordance with some aspects, method comprises receiving capabilities of mobile device, wherein the notifying is a function of capabilities of the mobile device.

Another aspect relates to a wireless communications apparatus comprising a memory and a processor. Memory retains instructions related to obtaining from a mobile device a request for establishment of a connection to wireless communications apparatus, ascertaining wireless communications apparatus can provide local IP access connectivity, and sending a notification to mobile device with dedicated signaling that local IP access connectivity is available. Processor is coupled to memory and is configured to execute instructions retained in memory.

A further aspect relates to a wireless communications apparatus that indicates availability of local Internet Protocol (IP) access connectivity. Wireless communications apparatus comprises means for receiving a request from a mobile device to establish a connection to wireless communications apparatus and means for deciding local IP access connectivity can be provided to mobile device. Wireless communications apparatus also comprises means for using dedicated signaling to notify mobile device that local IP access connectivity is available.

According to an aspect, means for using dedicated signaling further comprises means for using a radio resource control command, wherein radio resource control command is an RRCReconfigurationCommand message. According to an aspect, wireless communications apparatus further comprises means for receiving from a network entity a configuration that indicates whether to provide local IP access connectivity to mobile device.

An aspect relates to a computer program product comprising a computer-readable medium. Included in computer-readable medium is a first set of codes for causing a computer to receive a connection request and a second set of codes for causing computer to determine local IP access connectivity is available. Also included in computer-readable medium is a third set of codes for causing computer to convey information related to availability of local IP access connectivity.

Another aspect relates to at least one processor configured to indicate whether local Internet Protocol (IP) access connectivity is available. The at least one processor comprises a first module that receives from a mobile device a connection request and a second module that obtains a network configuration that indicates local IP access connectivity is available. The at least one processor also comprises a third module that sends over dedicated signaling a notification that local IP access connectivity is available.

A further aspect relates to a method for obtaining local Internet Protocol (IP) access capability information. Method comprises receiving from an access point an indication that comprises capability of access point to provide local IP access connectivity and requesting local IP access connectivity in response to the indication.

Another aspect relates to a wireless communications apparatus comprising a memory and a processor. Memory retains instructions related to receiving an indication that local IP access connectivity is available at an access point and requesting local IP access connectivity. Processor is coupled to memory and is configured to execute instructions retained in memory.

An aspect relates to a wireless communications apparatus that obtains local Internet Protocol (IP) access capability information. Wireless communications apparatus comprises means for receiving an indication that comprises capability of an access point to provide local IP access connectivity and means for requesting local IP access connectivity in response to the indication. Additionally, wireless communications apparatus comprises means for requesting to establish a connection with access point before means for receiving receives the indication.

Another aspect relates to a computer program product, comprising a computer-readable medium. Included in computer-readable medium is a first set of codes for causing a computer to receive an indication that an access point can provide local IP access connectivity and a second set of codes for causing computer to request local IP access connectivity.

A further aspect relates to at least one processor configured to obtain local Internet Protocol (IP) access capability information. Processor comprises a first module that requests a connection with an access point and a second module that receives an indication that the connection is available, wherein the connection is local IP access connectivity. Processor also comprises a third module that requests local IP access connectivity.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Figure 1:
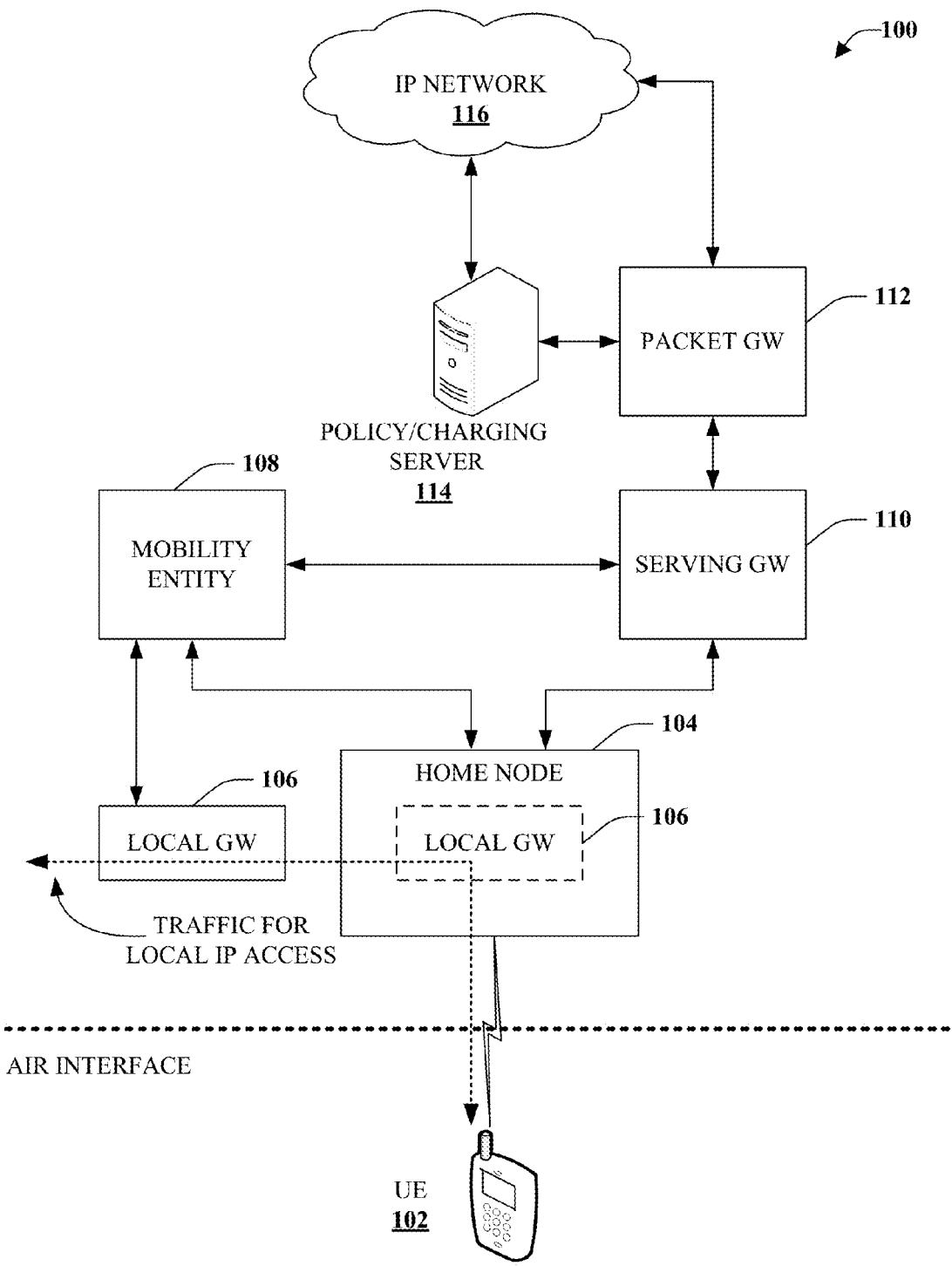
FIG. 1 illustrates a block diagram of an example wireless communication system according to an aspect.

FIG. 1 illustrates a block diagram of an example wireless communication system 100 according to an aspect. Wireless communication system 100 comprises a user equipment (a UE) 102 wirelessly coupled with a home node 104 (e.g., a subscriber-deployed base station or access point), over an air interface. The home node 104 is coupled with a Local Gateway (L-GW 106) that supports Local IP Access IP connections for terminals coupled with home node 104. (Alternatively, L-GW 106 can be included as part of home node 104, as depicted by the dashed line). The small dotted line indicates a route which local IP traffic takes for UE 102.

To implement voice or data services to home node 104, the home node is coupled with a mobility entity 108 (e.g., a mobility management entity [MME] and to a serving gateway 110. Mobility entity 108 can be employed to facilitate access to a wireless service provider network (e.g., a cellular network), an IP connection to support IP traffic (e.g., at a packet gateway 112), and further can establish a context or connection for local IP access traffic at L-GW 106. The services can be implemented through a serving gateway 110, which in turn is coupled to packet gateway 112. Packet gateway 112 accesses a policy and charging server 114 to verify subscription, subscription status, billing rate, accessible services, and so on, for UE 102. If a subscription associated with UE 102 supports IP traffic, packet gateway 112 can allow access to one or more IP networks 116 (e.g., the Internet, an intranet, IP-related services, and so on) to facilitate that IP traffic.

To establish a voice or data call, UE 102 initiates and transmits a request for such traffic to home node 104. Home node 104 then forwards the request to mobility entity 108. Mobility entity 108 determines what type of service is associated with the request, and initiates a connection for the traffic at a suitable gateway associated with home node 104.

Figure 2:
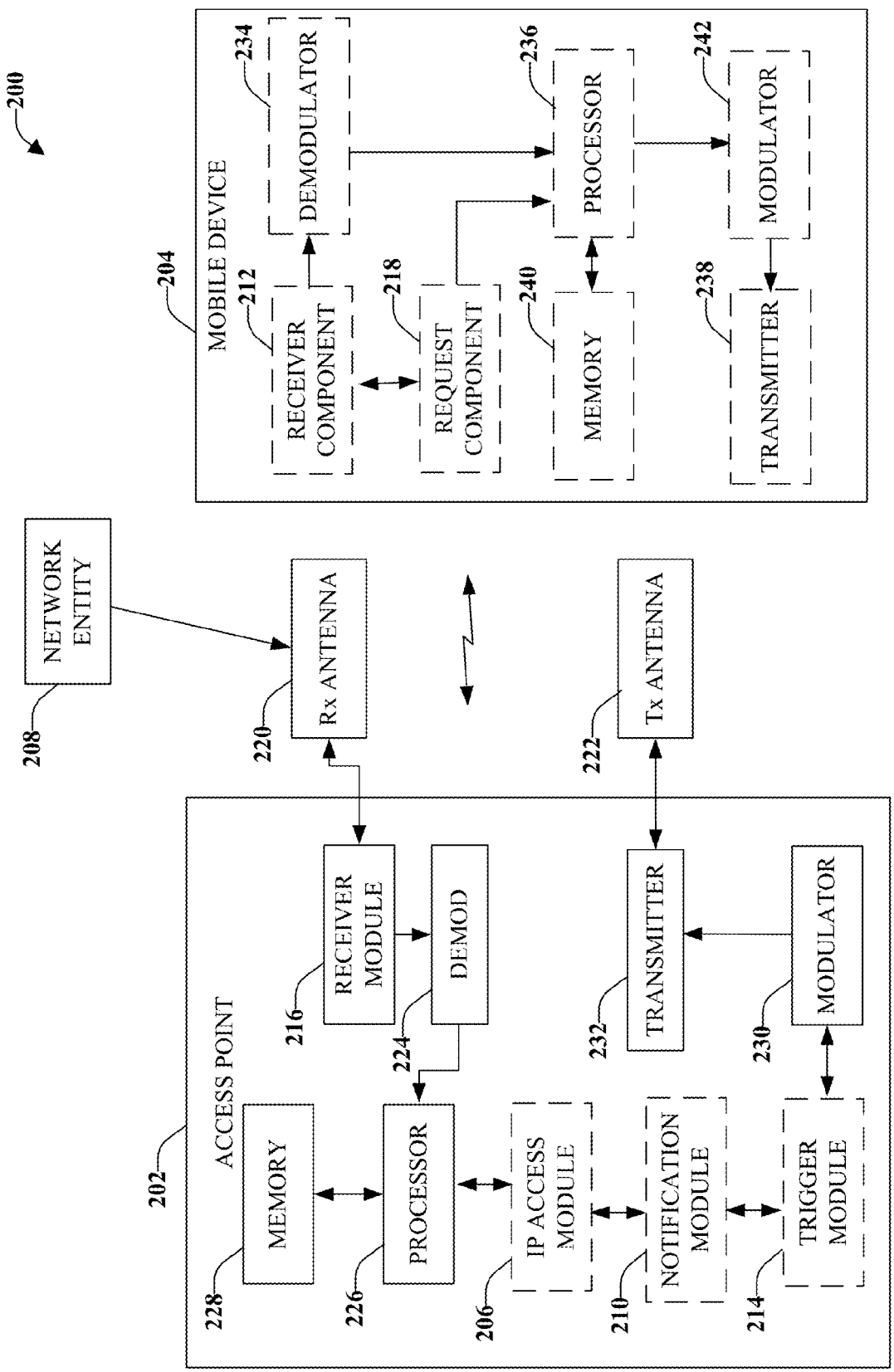
FIG. 2 illustrates a system configured to provide local Internet Protocol capability indication, according to an aspect.

FIG. 2 illustrates a system 200 configured to provide local Internet Protocol capability indication, according to an aspect. Local Internet Protocol (IP) access provides access for IP capable user devices to connect through an access point (e.g., using access point radio access) to other IP capable entities in the same residential/enterprise IP network. Traffic for local IP access is expected to not traverse a mobile operator's network. For example, local IP access can be provided by home access points (sometimes referred to as femto access points) using wireless wide area access technology (such as UMTS (Universal Mobile Telecommunications System, LTE (Long Term Evolution), HSPA (High-Speed Packet Access), HRPD (High Rate Packet Data), 1×, and so forth). With local IP access, a mobile station (access terminal, user equipment, mobile device, and so on depending on the technology) can connect to the locally available nodes in the home network (or other local network). The locally available nodes include a printer, media server, other computers, or other devices in the home/local network, through an access point.

Traditionally, in order to determine whether local IP access is supported, a mobile device has to request to activate a local Packet Data Network (PDN) connection and the network has to decide whether mobile device is allowed to establish the local PDN as well as where to establish the local PDN. If there is a new access point established and/or discovered, a mobile device will not know if that access point supports local IP access. In this situation, the mobile device needs to trigger signaling each time it discovers an access point in order to find out if that access point supports local IP access, which needlessly consumes system resources. The various aspects disclosed herein provide for dynamic notification of local IP access availability.

Included in system 200 are an access point 202 and one or more mobile devices, shown as a single mobile device 204. Access point 202 and/or mobile device can be wireless communication apparatuses. Access point 202 can be a femto access point or a macro access point configured to support local IP access. Although a number of access points 202 and mobile devices 204 can be included in system 200, as will be appreciated, a single access point 202 that transmits communication data signals with a single mobile device 204 is illustrated for purposes of simplicity.

Access point 202 can be configured to determine whether local IP access is supported. For example, a first user and a second user are subscribers of a first operator's network and a second operator's network, respectively. First user visits second user's house and second user allows first user to use the access point in second user's house. First user may (or may not) have access to subscribed services from the second operator based on policies set by second user and second operator, which can be based on an agreement between the first operator and the second operator.

If local IP access is supported, access point 202 notifies mobile device 204 of the IP access support by using common signaling (e.g., all mobile devices can receive and successfully decode the signaling) or dedicated signaling (e.g., the signaling is specific for one of the mobile devices). Mobile device 204 can be configured to receive the indication that local IP access is supported and can request local IP access connectivity in response to the indication.

Access point 202 can include an IP access module 206 that is configured to determine if local IP access connectivity is available at access point 202. Local IP access connectivity can be accessible directly from access point 202. In accordance with some aspects, access point 202 does not provide the local access point service but is connected to another node that provides the service. According to some aspects, the determination by IP access module 206 can include receiving from a network entity 208 a configuration that indicates whether to provide local IP access connectivity to mobile device 204. Alternatively or additionally, an indication can be received from network entity 208 that informs IP access module 206 that local IP access connectivity is allowed for mobile device 204.

Also included in access point 202 is a notification module 210 that is configured to send to mobile device 204 a notification that local IP access connectivity is available at access point 202. The notification is received by mobile device 204 at a receiver component 212. Notification module 210 can be configured to convey the notification using common signaling and/or dedicated signaling. In accordance with some aspects, if local IP access connectivity is not available, notification module 210 sends an unavailability of local IP access message to mobile device 204.

For common signaling, notification module 210 can advertise (broadcast) on an overhead channel an indication of the availably of local IP access connectivity. Overhead channel can comprise system information blocks (SIBs) and indication can be a bit (or other field) that indicates whether local IP access connectivity is available at access point 202. In accordance with some aspects, SIBs are an SIB1 or an SIB2 in Long Term Evolution (LTE). Use of common signaling can allow mobile device 204 to find out about local IP access availability before connecting to access point 202. As a result, access point 202 can also include a trigger module 214 that is configured to trigger a connection from mobile device 204 at about the same time as IP access is available and/or when mobile device 204 is within connectivity range of access point 202.

For dedicated signaling, a receiver module 216 is configured to receive from mobile device 204 a request to establish a connection to access point 202. In accordance with some aspects, request can be received before IP access module 206 determines whether IP access is supported. According to some aspects, request can be received at substantially the same time as IP access module 206 determines whether IP access is supported or after IP access module 206 makes the determination. Notification module 210 can use an indication with mobile device specific signaling over dedicated signaling, which provides the local IP access availability to mobile device 204 at substantially the same time as mobile device 204 connects to access point 202. In accordance with some aspects, to send the indication with dedicated signaling, notification module 210 uses a radio resource control (RRC) command. According to an aspect, RRC command is an RRCReconfigurationCommand message in LTE. In accordance with some aspects, dedicated signaling is NAS (Non Access Stratum) signaling. According to some aspects, receiver module 216 receives capabilities of mobile device 204 and notification module 210 sends the indication as a function of capabilities of mobile device 204. Dedicated signaling allows mobile device 204 to find out about the availability of local IP access after mobile device 204 connects to access point 202.

Common signaling and/or dedicated signaling allow mobile device 204 to make an appropriate choice about requesting local IP access connectivity. In the absence of such an indication, mobile device 204 needs to make a local IP access connectivity request, which is rejected every time mobile device goes into the coverage area of a femto access point or a macro access point, if the access point does not support Local IP access. The indication of Local IP access capability enables mobile device to request local IP access connectivity only when femto access point, or macro access point, has the local IP access capability, which can mitigate the signaling requirement.

A request component 218 of mobile device 204 can be configured to send a request for local IP access connectivity in response to the indication. The request can be received by receiver module 216. In accordance with some aspects, when dedicated signaling is utilized, the request can be a second request to establish a local IP access connectivity.

As illustrated, access point receives signal(s) from one or more communication devices (e.g., mobile device 204, network entity 208) by a receive antenna 220, and transmits to the one or more communication devices through a transmit antenna 222. Receiver module 216 receives information from receive antenna 220 and is operatively associated with a demodulator 224 that demodulates received information. Demodulated symbols are analyzed by at least one processor 226 that is coupled to a memory 228 that stores information related to local IP access connectivity. A modulator 230 can multiplex the signal for transmission by a transmitter 232 through transmit antenna 222 to communication devices.

Processor 226 can be configured to indicate whether local Internet Protocol (IP) access is available. Processor 226 can comprise a first module that receives from network entity 208 a configuration that indicates whether to provide local IP access connectivity or an indication that the local IP access connectivity is allowed (or is not allowed) for mobile device 204. Processor 226 can also comprise a second module that ascertains the local IP access connectivity is available as a function of the configuration or the indication and a third module that conveys over common signaling a notification that the local IP access connectivity is available. Additionally, processor 226 can comprise a fourth module for inserting a bit in an overhead channel and the third module sends the overhead channel over the common signaling. The bit can indicate availability of the local IP access connectivity.

Alternatively or additionally, processor 226 can be configured to indicate whether local Internet Protocol (IP) access connectivity is available. Processor 226 can comprise a first module that receives from mobile device 204 a connection request and a second module that obtains a network configuration that indicates local IP access connectivity is available (or is not available). Processor 226 can also comprise a third module that sends over dedicated signaling a notification that the local IP access connectivity is available (or is not available). Additionally, processor 226 can comprise a fourth module that receives capabilities of the mobile device 204 and third module sends the notification as a function of the capabilities of the mobile device 204.

In accordance with some aspects, memory 228 can retain instructions related to ascertaining that local IP access connectivity is available at access point 202 and sending a notification through common signaling that local IP access connectivity is available. Further, memory 228 can retain instructions related to advertising on an overhead channel an indication of local IP access connectivity, wherein overhead channel comprises system information blocks and indication is a bit that indicates availability of local IP access connectivity. According to some aspects, memory 228 retains further instructions related to receiving a configuration from network entity 208, wherein configuration indicates whether to provide local IP access connectivity. According to some aspects, memory 228 retains further instructions related to receiving from network entity 208 an indication that local IP access connectivity is allowed (or is not allowed) for mobile device 204.

In accordance with some aspects, memory 228 can retain instructions related to obtaining from mobile device 204 a request for establishment of a connection to access point 202, ascertaining access point 202 can provide local IP access connectivity, and sending a notification to mobile device 204 with dedicated signaling that local IP access connectivity is available. Additionally, memory 228 can retain further instructions related to receiving from network entity 208 a configuration that indicates whether to provide local IP access connectivity to mobile device 204. In accordance with some aspects, memory 228 retains further instructions related to sending an indication with mobile device specific signaling and using a radio resource control command.

Receiver component 212 of mobile device 204 can receive a signal from, for example, a receiver antenna. Receiver component 212 can perform typical actions thereon, such as filtering, amplifying, downconverting, etc. the received signal. Receiver component 212 can also digitize the conditioned signal to obtain samples. A demodulator 234 can obtain received symbols for each symbol period, as well as provide received symbols to at least one processor 236.

Processor 236 can be a processor dedicated to analyzing information received by receiver component 212 and/or generating information for transmission by a transmitter 238. In addition or alternatively, processor 236 can control one or more components of mobile device 204, analyze information received by receiver component 212, generate information for transmission by transmitter 238, and/or control one or more components of mobile device 204. Processor 236 may include a controller component capable of coordinating communications with additional user devices and/or access points.

Processor 236 can be configured to obtain local Internet Protocol (IP) access capability information. Processor 236 can comprise a first module that requests a connection with an access point 202 and a second module that receives an indication that the connection is available, wherein the connection is local IP access connectivity. Processor 236 can also comprise a third module that requests the local IP access connectivity. In accordance with some aspects, second module receives an overhead channel that comprises system information blocks.

Mobile device 204 can additionally comprise memory 240 operatively coupled to processor 236. Memory 240 can store information related to coordinating communications and any other suitable information. Memory 240 can additionally store protocols associated with local IP access. Mobile device 204 can further comprise a symbol modulator 242, wherein transmitter 238 transmits the modulated signal.

Memory 240 can retain instructions related to receiving an indication that local IP access connectivity is available at access point 202 and requesting the local IP access connectivity. Additionally, memory 240 can retain further instructions related to obtaining the indication in an overhead channel that comprises system information blocks. In accordance with some aspects, memory 240 retains further instructions related to receiving the indication over common signaling or dedicated signaling.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 3:
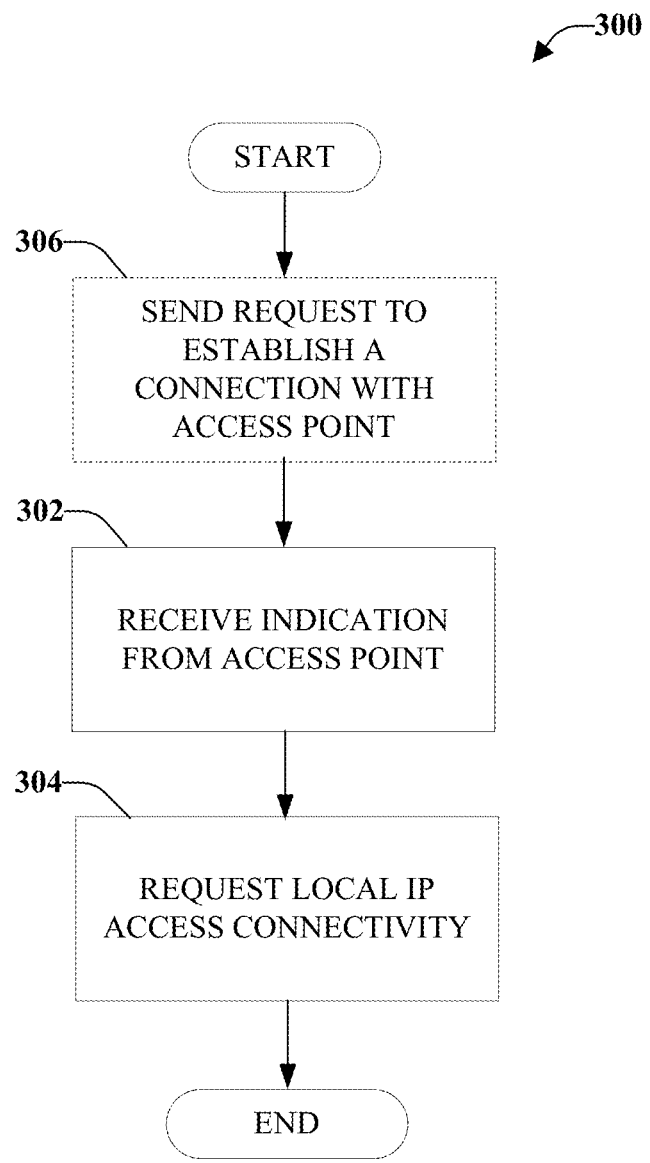
FIG. 3 illustrates a method for obtaining local Internet Protocol access capability information, according to an aspect.

FIG. 3 illustrates a method 300 for obtaining local internet protocol (IP) access capability information, according to an aspect. Method 300 can be performed by a user terminal. Method 300 starts, at 302 when an indication is received from an access point. The indication comprises capability of access point to provide local IP access connectivity. The indication can be obtained over common signaling. According to an aspect, the indication is obtained in an overhead channel, which can comprise system information blocks. In accordance with some aspects, indication is obtained over dedicated signaling. According to an aspect, the indication is obtained over a user terminal specific signaling. The receiving, at 302, can include receiving a RRC command, which can be an RRCReconfigurationCommand message. At 304, local IP access connectivity is requested in response to the indication.

Optionally, at 306, a request to establish a connection with the access point is sent before receiving the indication, at 302. If the request to establish the connection is sent, at 306, the request for local IP access, at 304, is a second request to establish a local IP access connectivity.

In accordance with some aspects, a computer program product can include a computer-readable medium that comprises codes for carrying out various aspects of method 300. Computer-readable medium can include a first set of codes for causing a computer to receive an indication that an access point can provide local IP access connectivity. Computer-readable medium can also include a second set of codes for causing computer to request local IP access connectivity. In accordance with some aspects, first set of codes receives the indication over common signaling or dedicated signaling.

Figure 4:
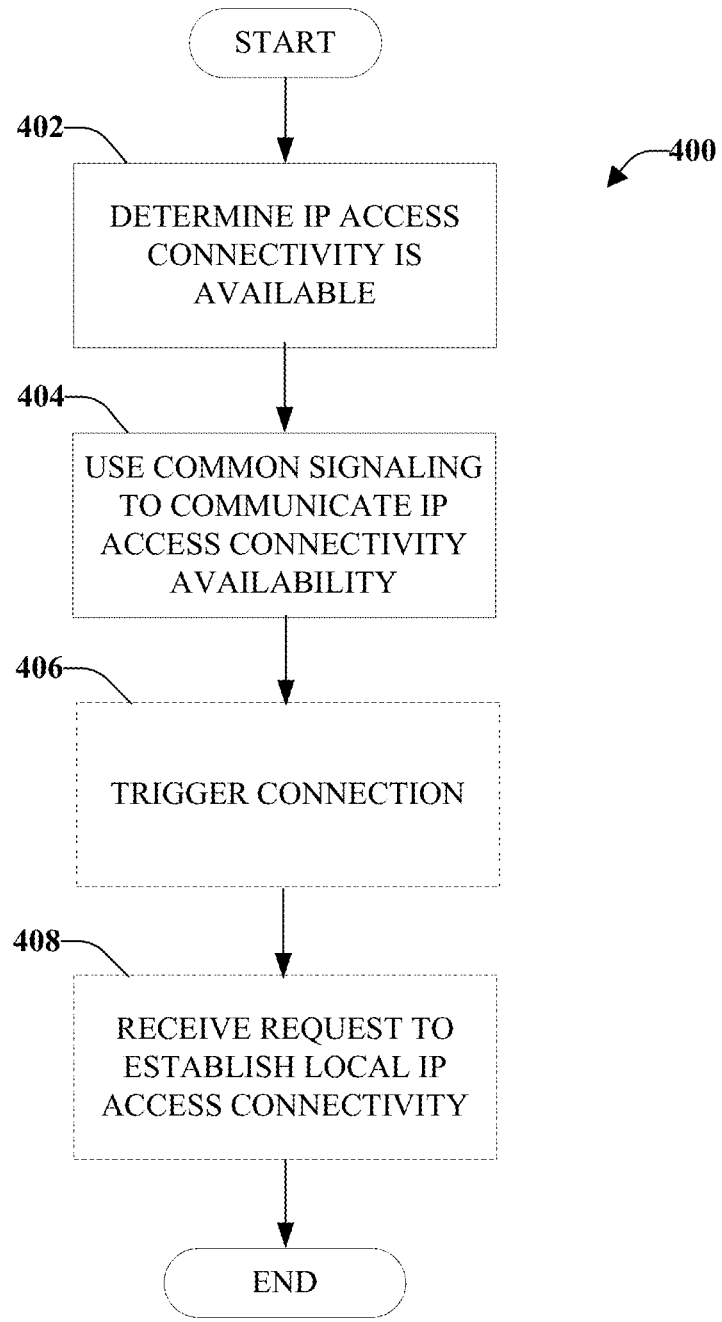
FIG. 4 illustrates a method for indicating with common signaling whether an access point provides local Internet Protocol access, according to an aspect.

FIG. 4 illustrates a method 400 for indicating with common signaling whether an access point provides local Internet Protocol (IP) access, according to an aspect. Method 400 can be performed by an access point. Method 400 starts, at 402, when a determination is made that local IP access connectivity is available at access point. The determination can be made based on receiving a configuration from a network entity. Received configuration indicates whether to provide local IP access connectivity to a mobile device. In accordance with some aspects, the determination is based on receiving, from network entity, an indication that local IP access connectivity is allowed for mobile device.

At 404, mobile device is notified through use of common signaling that local IP access connectivity is available at access point. The notification can comprise advertising on an overhead channel an indication of the availability of the local IP access connectivity. Overhead channel can comprise system information blocks and the indication can be a bit that indicates whether local IP access connectivity is available at access point.

In accordance with some aspects, method 400 continues, at 406, when a connection is triggered from mobile device. Alternatively or additionally, method continues, at 408, when a request to establish local IP access connectivity at access point is received from mobile device.

In accordance with some aspects, a computer program product can include a computer-readable medium that comprises codes for carrying out various aspects of method 400. Computer-readable medium can include a first set of codes for causing a computer to determine local IP access connectivity is available for a mobile device. Also included in computer-readable medium is a second set of codes for causing computer to use common signaling to send to mobile device an indication that local IP access connectivity is available. According to some aspects, first set of codes receives a configuration from a network entity that indicates whether to provide local IP access connectivity to mobile device or receives an indication that local IP access connectivity is allowed for mobile device.

Figure 5:
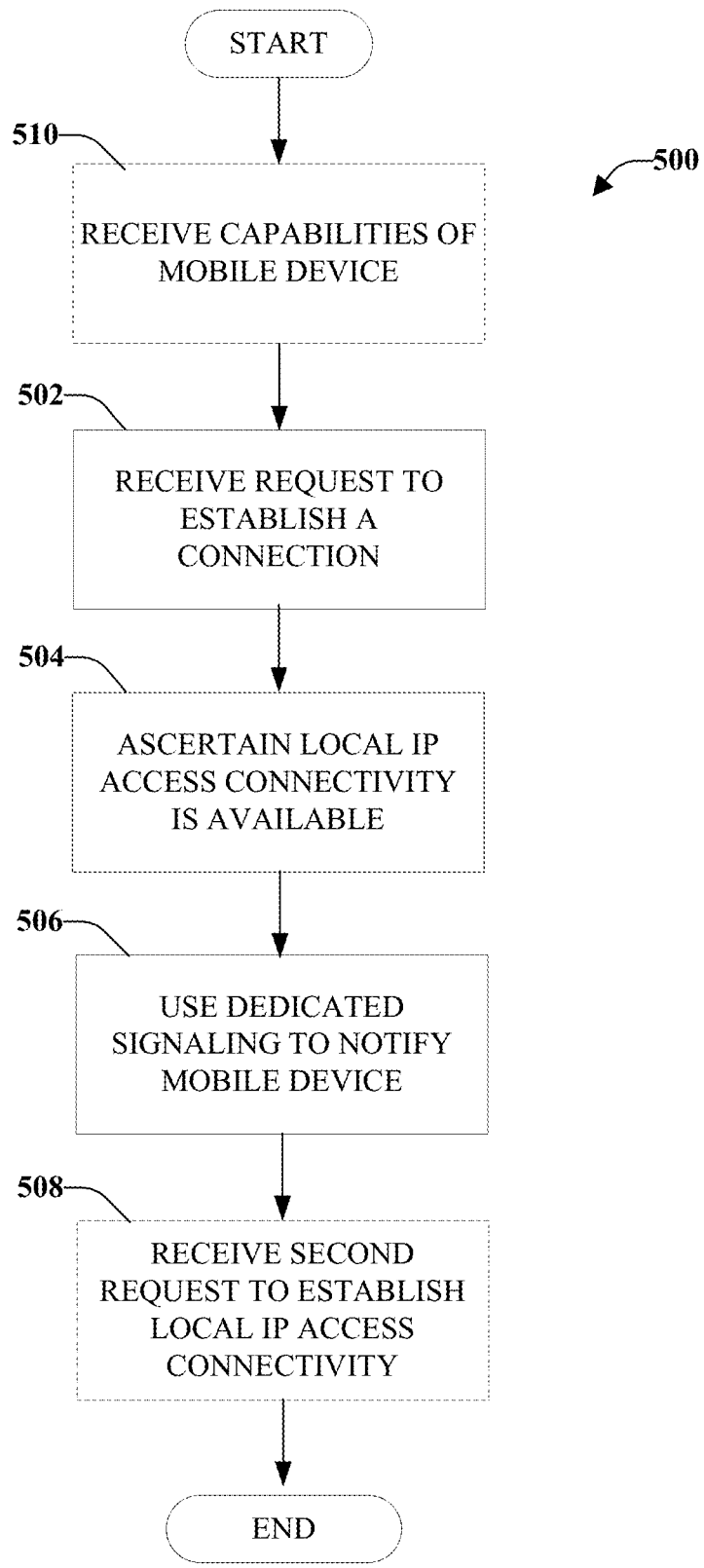
FIG. 5 illustrates a method for indicating with dedicated signaling whether an access point provides local Internet Protocol access, in accordance with an aspect.

FIG. 5 illustrates a method 500 for indicating with dedicated signaling whether an access point provides local Internet Protocol (IP) access, in accordance with an aspect. Method 500 can be performed by an access point and starts, at 502, when a request to establish a connection to access point is received from a mobile device. At 504, it is determined that access point is able to provide local IP access connectivity. The determination can be made based on receiving a configuration from a network entity. Configuration indicates whether to provide local IP access connectivity to mobile device.

At 506, mobile device is notified, through use of dedicated signaling, that local IP access connectivity is available at access point. Dedicated signaling can comprise sending an indication with mobile device specific signaling. In accordance with some aspects, dedicated signaling comprises using a RRC command. The RRC command can be an RRCReconfigurationCommand message.

According to some aspects, method 500 continues, at 508, when a second request to establish a local IP access connectivity is received from mobile device. Alternatively or additionally, method 500 starts, at 510, with receiving capabilities of mobile device. In this aspect, the notifying, at 506, is a function of the capabilities of mobile device.

In accordance with some aspects, a computer program product can include a computer-readable medium that comprises codes for carrying out various aspects of method 500. Computer-readable medium can include a first set of codes for causing a computer to receive a connection request and a second set of codes for causing computer to determine local IP access connectivity is available. Computer-readable medium can also include a third set of codes for causing computer to convey information related to availability of local IP access connectivity. In accordance with some aspects, computer-readable medium includes a fourth set of codes for causing computer to receive from a network entity a configuration that indicates whether to provide local IP access connectivity.

Figure 6:
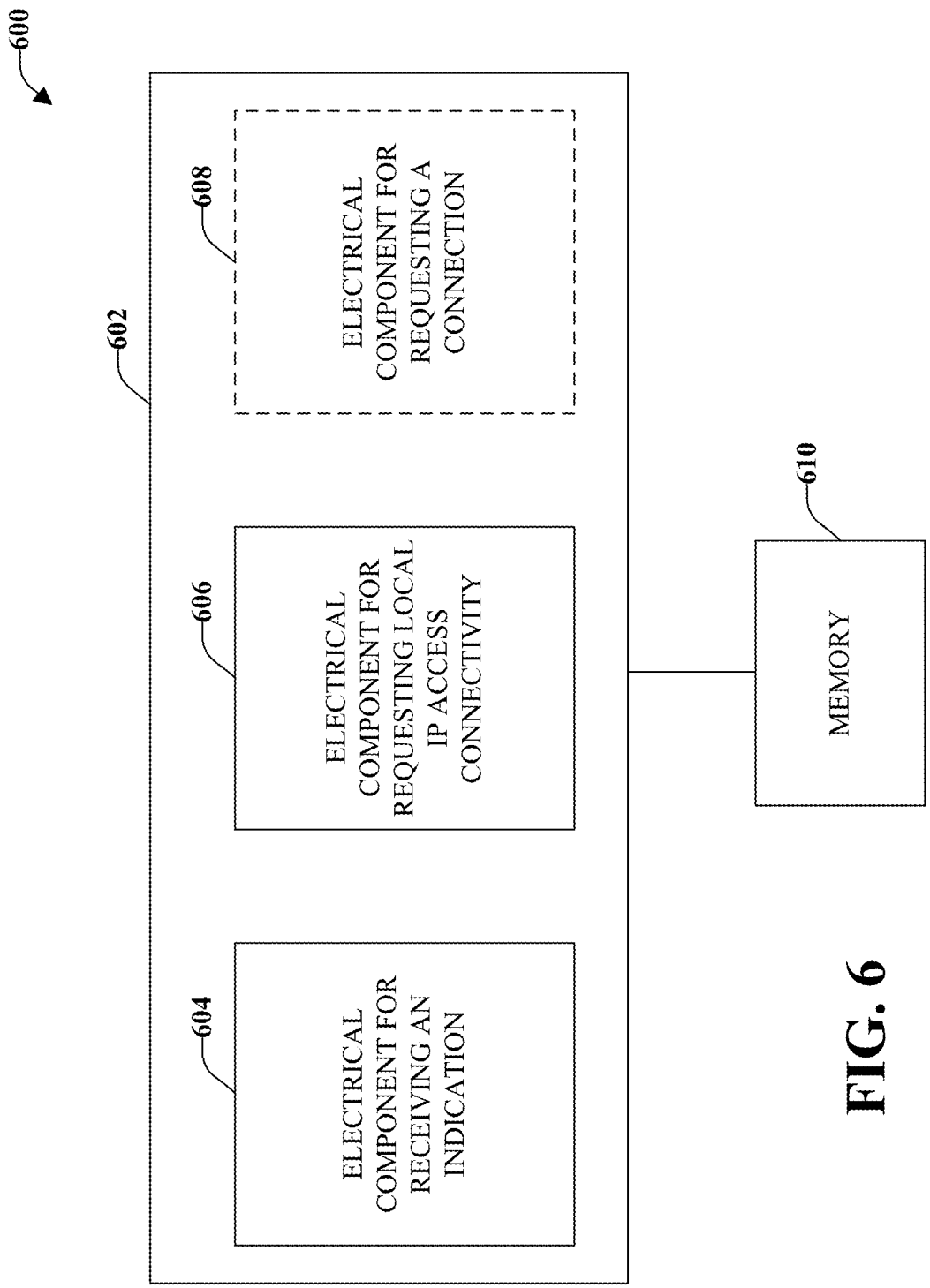
FIG. 6 illustrates an example system that obtains local Internet Protocol (IP) access capability information, in accordance with an aspect.

With reference to FIG. 6, illustrated is an example system 600 that obtains local Internet Protocol (IP) access capability information, in accordance with an aspect. System 600 may reside at least partially within a mobile device. It is to be appreciated that system 600 is represented as including functional blocks, which may be functional blocks that represent functions implemented by a processor, software, or combination thereof (e.g., firmware).

System 600 includes a logical grouping 602 of electrical components that can act separately or in conjunction. Logical grouping 602 includes an electrical component 604 for receiving an indication that comprises capability of an access point to provide local IP access connectivity. The indication can be received over common signaling. In accordance with some aspects, the indication can be received in an overhead channel, which can comprise system information blocks. In accordance with some aspects, the indication is received over dedicated signaling. According to some aspects, the indication is obtained over a mobile device specific signaling. Also included in logical grouping 602 is an electrical component 606 for requesting local IP access connectivity in response to the indication.

In accordance with some aspects, logical grouping 602 includes an electrical component 608 for requesting to establish a connection with access point before electrical component 604 receives the indication. According to some aspects, logical grouping 602 includes an electrical component for requesting to establish a connection with access point before electrical component 604 receives the indication.

Additionally, system 600 can include a memory 610 that retains instructions for executing functions associated with electrical components 604, 606, and 608 or other components. While shown as being external to memory 610, it is to be understood that one or more of electrical components 604, 606, and 608 may exist within memory 610.

Figure 7:
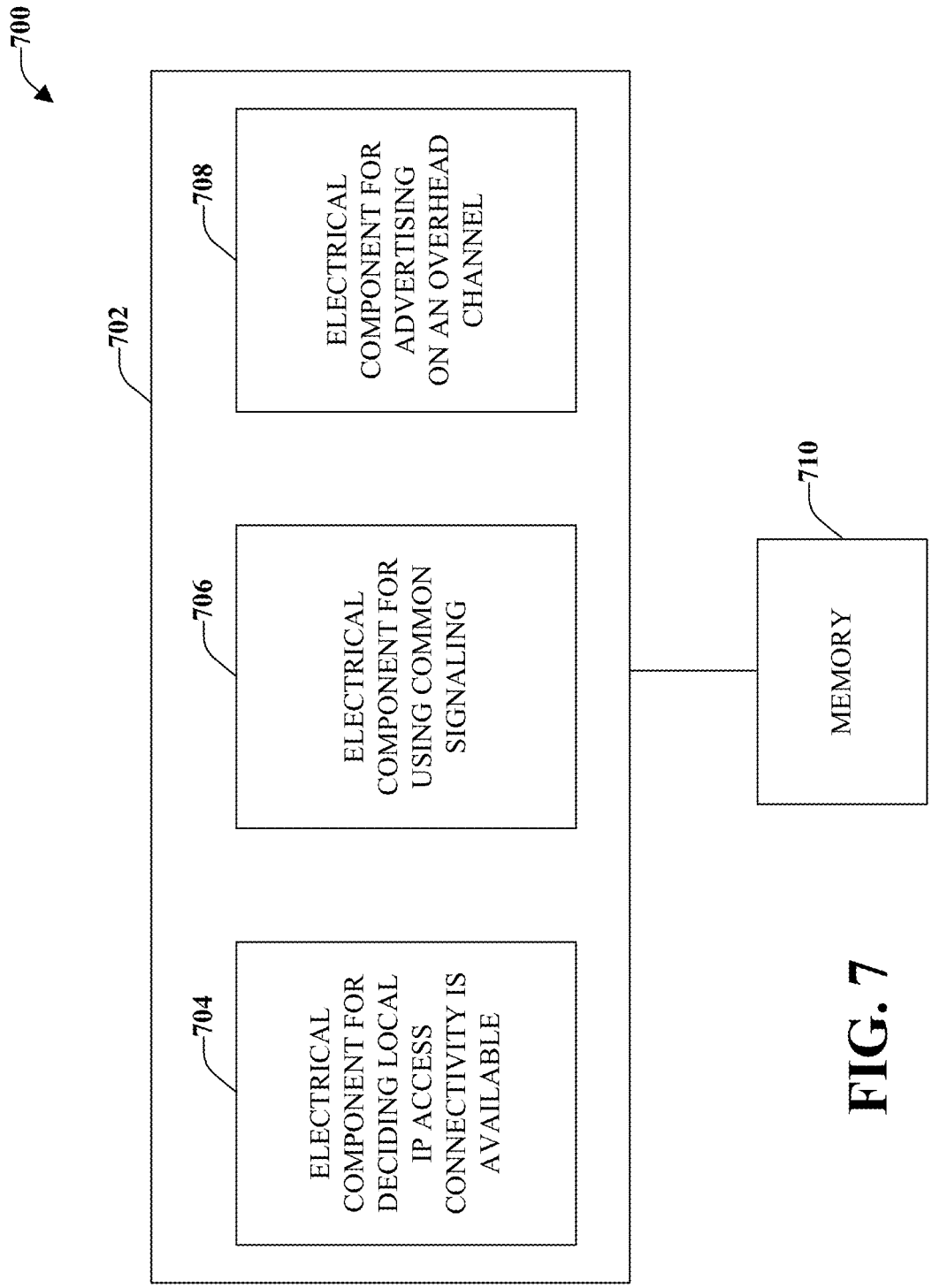
FIG. 7 illustrates an example system that indicates whether local Internet Protocol access is provided, according to an aspect.

FIG. 7 illustrates an example system 700 that indicates whether local Internet Protocol (IP) access is provided, according to an aspect. System can reside at least partially within an access point. System 700 is represented as including functional blocks, which may be functional blocks that represent functions implemented by a processor, software, or combination thereof (e.g., firmware).

System 700 includes a logical grouping 702 of electrical components that can act separately or in conjunction. Included in logical grouping 702 is an electrical component 704 for deciding local IP access connectivity is available at system 700. The determination by electrical component 704 can be based on receiving a configuration from a network entity. The configuration indicates whether to provide local IP access connectivity to a mobile device. In accordance with some aspects, the determination by electrical component 702 can be based upon receiving from a network entity an indication that the local IP access connectivity is allowed for a mobile device.

Also included in logical grouping 702 is an electrical component 706 for using common signaling to convey an availability of local IP access connectivity at system 700.

In accordance with some aspects, logical grouping 702 includes an electrical component 708 for advertising on an overhead channel an indication of local IP access connectivity. The overhead channel can comprise system information blocks and an indication is a bit that indicates the availability of local IP access connectivity.

According to some aspects, logical grouping 702 includes an electrical component for triggering a connection from mobile device. Alternatively or additionally, logical grouping 702 can include an electrical component for receiving from mobile device a request to establish local IP access connectivity.

System 700 can include a memory 710 that retains instructions for executing functions associated with electrical components 704, 706, and 708 or other components. While shown as being external to memory 710, one or more of electrical components 704, 706, and 708 may exist within memory 710.

Figure 8:
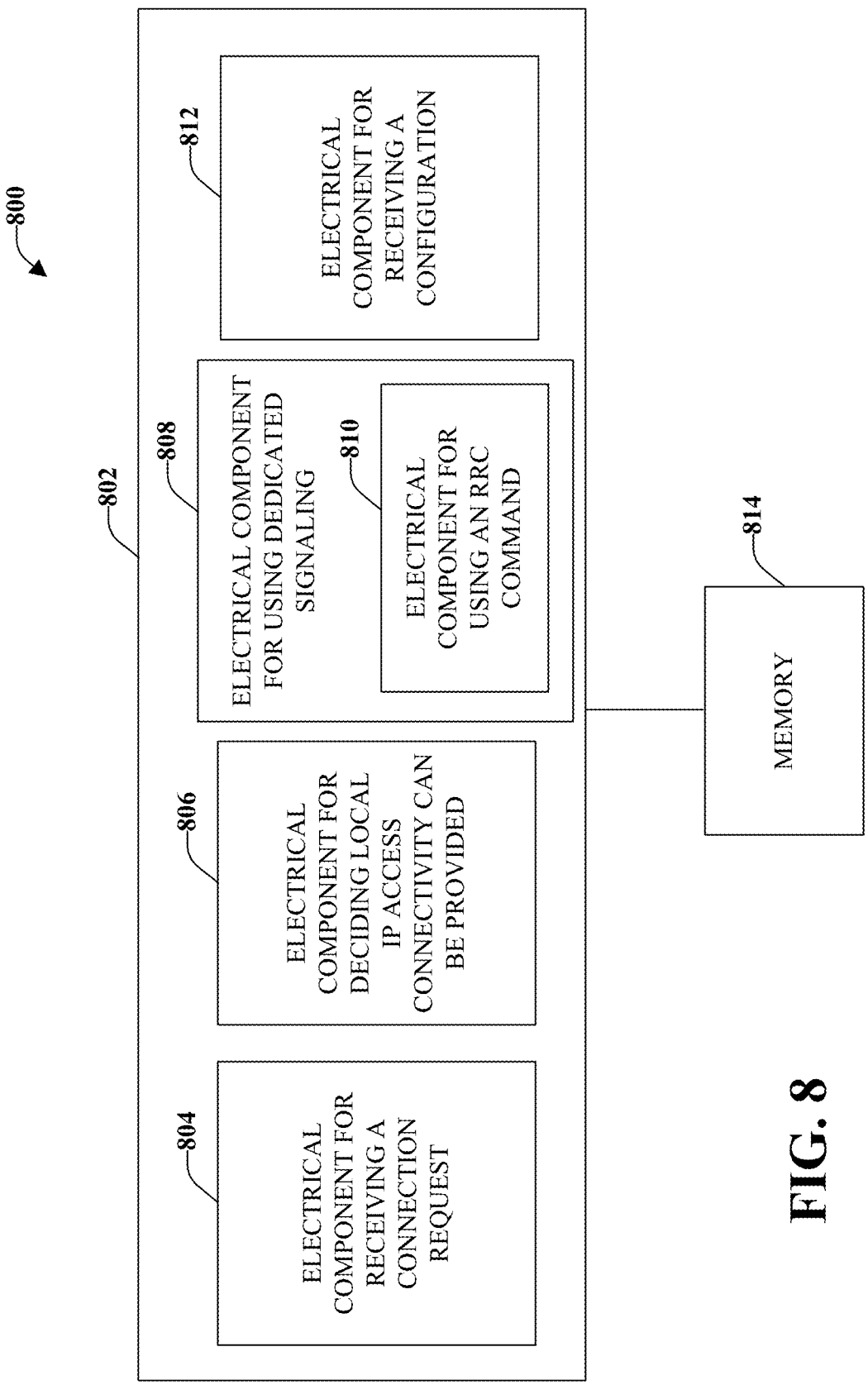
FIG. 8 illustrates an example system that indicates availability of local Internet Protocol access connectivity, according to an aspect.

FIG. 8 illustrates an example system 800 that indicates availability of local Internet Protocol (IP) access connectivity, according to an aspect. System 800 may reside at least partially within an access point and is represented as including functional blocks, which may be functional blocks that represent functions implemented by a processor, software, or combination thereof (e.g., firmware).

System 800 includes a logical grouping 802 of electrical components that can act separately or in conjunction. Logical grouping 802 includes an electrical component 804 for receiving a request from a mobile device to establish a connection to system 800. Also included in logical grouping 802 is an electrical component 806 for deciding local IP access connectivity can be provided to mobile device. Further, logical grouping 802 includes an electrical component 808 for using dedicated signaling to notify mobile device that local IP access connectivity is available.

In accordance with some aspects, electrical component 808 comprises an electrical component 810 for using a radio resource control command. In accordance with some aspects, the radio resource control command is an RRCReconfigurationCommand message. According to some aspects, logical grouping 802 includes an electrical component 812 for receiving from a network entity a configuration that indicates whether to provide local IP access connectivity to mobile device System 800 comprises a memory 814 that retains instructions for executing functions associated with electrical components 804, 806, 808, 810, and 812 or other components. While shown as being external to memory 814, one or more of electrical components 804, 806, 808, 810, and 812 can exist within memory 814.

Figure 9:
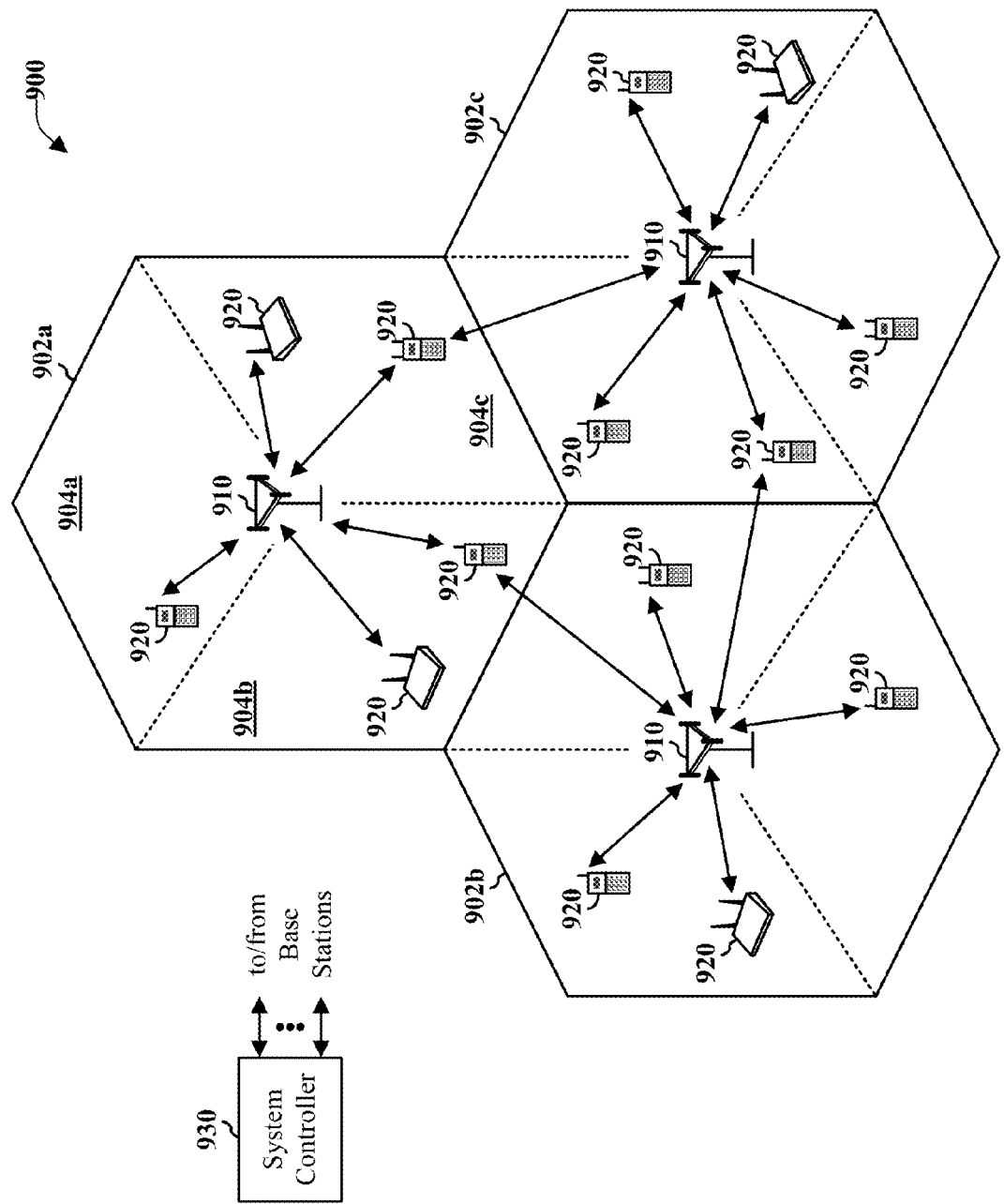
FIG. 9 illustrates a wireless communication system with multiple base stations and multiple terminals that can be utilized in conjunction with one or more aspects.

FIG. 9 illustrates a wireless communication system 900 with multiple base stations (BSs) 910 (e.g., wireless access points, wireless communication apparatus) and multiple terminals 920 (e.g., ATs), such as can be utilized in conjunction with one or more aspects. A BS 910 is generally a fixed station that communicates with the terminals and can also be called an access point, a Node B, an eNodeB, or some other terminology. Each BS 910 provides communication coverage for a particular geographic area or coverage area, illustrated as three geographic areas in FIG. 9, labeled 902a, 902b, and 902c. The term "cell" can refer to a BS or its coverage area depending on the context in which the term is used. To improve system capacity, a BS geographic area/coverage area can be partitioned into multiple smaller areas (e.g., three smaller areas, according to cell 902a in FIG. 9), 904a, 904b, and 904c. Each smaller area (904a, 904b, 904c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 920 are typically dispersed throughout the system, and each terminal 920 can be fixed or mobile. Terminals 920 can also be called a mobile station, user equipment, a user device, wireless communication apparatus, an access terminal, a user terminal or some other terminology. A terminal 920 can be a wireless device, a cellular phone, a personal digital assistant (PDA), a wireless modem card, and so on. Each terminal 920 can communicate with zero, one, or multiple BSs 910 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 930 couples to base stations 910 and provides coordination and control for BSs 910. For a distributed architecture, BSs 910 can communicate with one another as needed (e.g., by way of a wired or wireless backhaul network communicatively coupling the BSs 910). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 10:
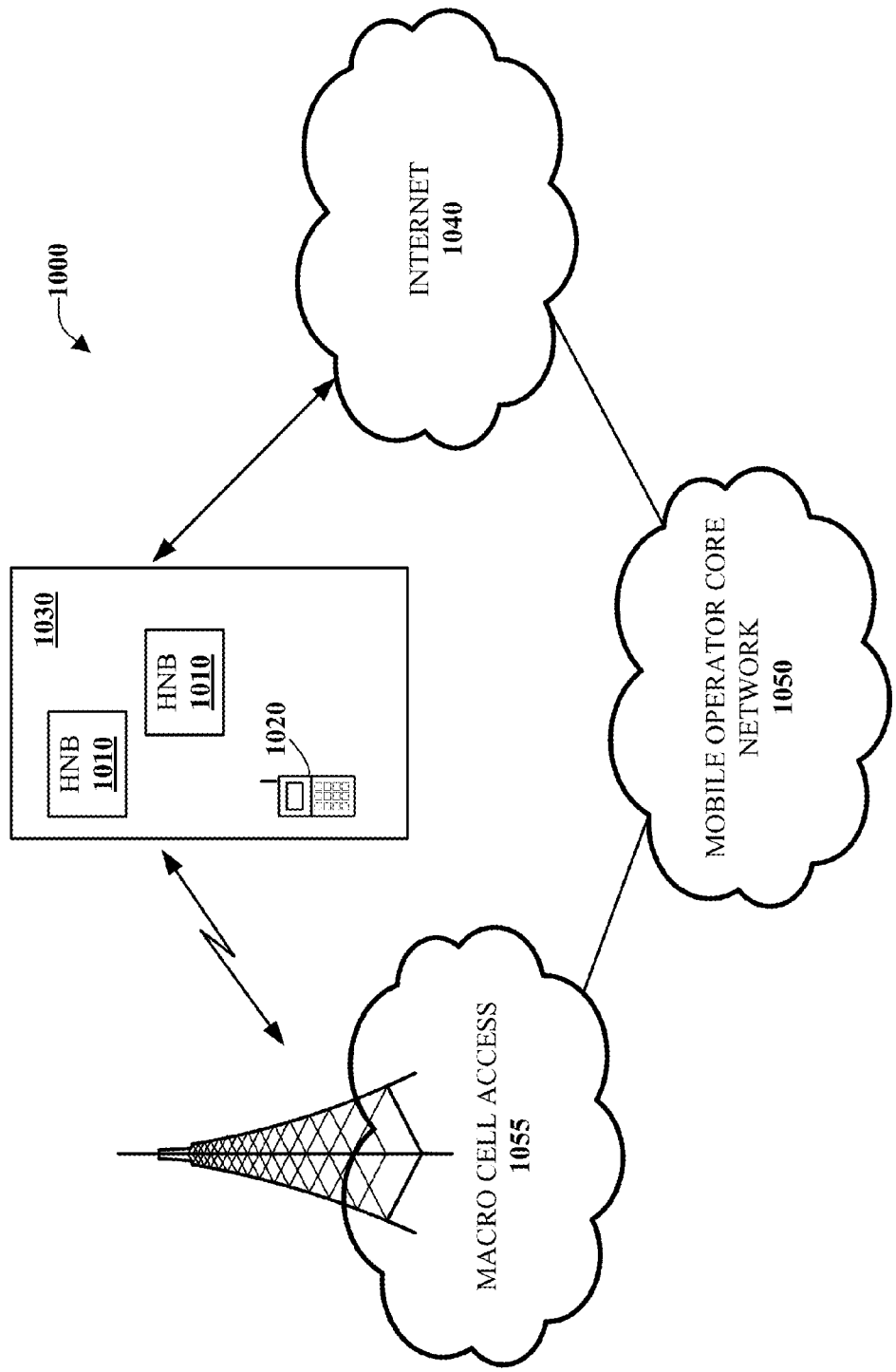
FIG. 10 illustrates a planned or semi-planned wireless communication environment, in accordance with various aspects.

FIG. 10 is an illustration of a planned or semi-planned wireless communication environment 1000, in accordance with various aspects. Communication environment 1000 includes multiple access point BSs including HNBs 1010 (or HeNBs), each of which are installed in corresponding small scale network environments. Examples of small scale network environments can include user residences, places of business, indoor/outdoor facilities 1030, and so forth. The HNBs 1010 can be configured to serve associated UEs 1020 (e.g., included in a CSG associated with HNBs 1010), or optionally alien or visitor UEs 1020 (e.g., that are not configured for the CSG of the HNB 1010). Each HNB 1010 is further coupled to the Internet 1040 and a mobile operator core network 1050 via a DSL router (not shown), or, alternatively, a cable modem, broadband over power line connection, satellite Internet connection, or a like broadband Internet connection (not shown).

To implement wireless services via HNBs 1010, an owner of the HNBs 1010 subscribes to mobile service, such as 3G mobile services, offered through the mobile operator core network 1050. Also, the UE 1020 can be capable to operate in a macro cellular environment and/or in a residential small scale network environment, utilizing various techniques described herein. Thus, at least in some disclosed aspects, HNB 1010 can be backward compatible with any suitable existing UE 1020. Furthermore, in addition to the macro cell mobile network 1055, UE 1020 is served by a predetermined number of HNBs 1010, specifically HNBs 1010 that reside within a corresponding user residence(s), place(s) of business, or indoor/outdoor facilities 1030, and cannot be in a soft handover state with the macro cell mobile network 1055 of the mobile operator core network 1050. It should be appreciated that although aspects described herein employ 3GPP terminology, it is to be understood that the aspects can also be applied to 3GPP technology (Release 99 [Rel99], Rel5, Rel6, Rel7), as well as 3GPP2 technology (1xRTT, 1xEV-DO Rel0, RevA, RevB) and other known and related technologies.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features are presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A method performed by an access point for indicating whether the access point provides local Internet Protocol (IP) access, comprising:
    determining, by an access point, that local IP access connectivity is available for a mobile device at the access point based on a configuration or an indication that the access point received from a network entity, wherein the configuration indicates whether to provide the local IP access connectivity to the mobile device and the indication indicates that the local IP access connectivity is allowed for the mobile device; and
    notifying the mobile device through use of common signaling by broadcasting that the local IP access connectivity is available at the access point before the mobile device has connected to the access point.

2. The method of claim 1, further comprising triggering a connection from the mobile device.

3. The method of claim 1, further comprising receiving from the mobile device a request to establish the local IP access connectivity at the access point.

4. The method of claim 1, wherein the broadcasting comprises:

advertising on an overhead channel an indication of availability of the local IP access connectivity.

5. The method of claim 4, wherein the overhead channel comprises system information blocks and a bit indicates whether the local IP access connectivity is available at the access point.

6. A wireless communications apparatus, comprising:
a memory that retains instructions related to ascertaining that local IP access connectivity is available for a mobile device at the wireless communications apparatus based on a configuration or an indication that the access point received from a network entity, wherein the configuration indicates whether to provide the local IP access connectivity to the mobile device and the indication indicates that the local IP access connectivity is allowed for the mobile device and sending a notification through common signaling by broadcasting that the local IP access connectivity is available at the wireless communications apparatus before the mobile device has connected to the wireless communications apparatus; and
a processor, coupled to the memory, configured to execute the instructions retained in the memory.

7. The wireless communications apparatus of claim 6, wherein the memory retains further instructions related to advertising on an overhead channel an indication of the local IP access connectivity, wherein the overhead channel comprises system information blocks and the indication is a bit that indicates availability of the local IP access connectivity.

8. A wireless communications apparatus that indicates availability of local Internet Protocol (IP) access, comprising:
means for deciding local IP access connectivity is available for a mobile device at the wireless communications apparatus based on a configuration or an indication that the access point received from a network entity, wherein the configuration indicates whether to provide the local IP access connectivity to the mobile device and the indication indicates that the local IP access connectivity is allowed for the mobile device; and
means for using common signaling to broadcast an availability of local IP access connectivity at the wireless communications apparatus to the mobile device before the mobile device has connected to the wireless communications apparatus.

9. The wireless communications apparatus of claim 8, further comprising:
means for advertising on an overhead channel an indication of local IP access connectivity, wherein the overhead channel comprises system information blocks and an indication is a bit that indicates the availability of local IP access connectivity.

10. A computer program product, comprising:
a non-transitory computer-readable medium comprising:
a first set of codes for causing a wireless communications apparatus to determine local IP access connectivity is available for a mobile device at the wireless communications apparatus based on a configuration or an indication that the access point received from a network entity, wherein the configuration indicates whether to provide the local IP access connectivity to the mobile device and the indication indicates that the local IP access connectivity is allowed for the mobile device; and
a second set of codes for causing the wireless communications apparatus to use common signaling to broadcast to the mobile device an indication that the local IP access connectivity is available before the mobile device has connected to the wireless communications apparatus.

11. At least one processor in a wireless communications apparatus configured to indicate whether local Internet Protocol (IP) access is available, the processor comprising:
a first module that receives from a network entity a configuration that indicates whether to provide local IP access connectivity to a mobile device or an indication that the local IP access connectivity is allowed for the mobile device;
a second module that ascertains the local IP access connectivity is available as a function of the configuration or the indication; and
a third module that conveys over common signaling by broadcasting to the mobile station a notification that the local IP access connectivity is available at the wireless communication apparatus before the mobile device has connected to the wireless communications apparatus.

12. The at least one processor of claim 11, further comprising:
a fourth module for inserting a bit in an overhead channel, wherein the bit indicates availability of the local IP access connectivity, the third module sends the overhead channel over the common signaling.

13. A method for indicating whether an access point provides local Internet Protocol (IP) access connectivity, comprising:
receiving from a mobile device a request to establish a connection to the access point;
determining, by the access point, whether the access point is able to provide local IP access connectivity to the mobile device based on a configuration or an indication that the access point received from a network entity, wherein the configuration indicates whether to provide the local IP access connectivity to the mobile device and the indication indicates that the local IP access connectivity is allowed for the mobile device;
notifying the mobile device through use of dedicated signaling that the local IP access connectivity is available at the access point to enable access to at least one locally available node; and
receiving capabilities of the mobile device, wherein the notifying is a function of the capabilities of the mobile device.

14. The method of claim 13, wherein the dedicated signaling comprises sending an indication with mobile device specific signaling.

15. The method of claim 13, wherein the dedicated signaling comprises using a radio resource control (RRC) command, wherein the RRC command is an RRCReconfigurationCommand message.

16. The method of claim 13, further comprising receiving from the mobile device a second request to establish the local IP access connectivity.

17. A wireless communications apparatus, comprising:
a memory that retains instructions related to obtaining from a mobile device a request for establishment of a connection to the wireless communications apparatus, ascertaining the wireless communications apparatus can provide local IP access connectivity to the mobile device based on a configuration or an indication that the wireless communications apparatus received from a network entity, wherein the configuration indicates whether to provide the local IP access connectivity to the mobile device and the indication indicates that the local IP access connectivity is allowed for the mobile device, sending a notification to the mobile device with dedicated signaling that the local IP access connectivity is available to enable access to at least one locally available node, and receiving capabilities of the mobile device, wherein the notification is a function of capabilities of the mobile device; and a processor, coupled to the memory, configured to execute the instructions retained in the memory.

18. The wireless communications apparatus of claim 17, wherein the memory retains further instructions related to sending an indication with mobile device specific signaling and using a radio resource control command.

19. A wireless communications apparatus that indicates availability of local Internet Protocol (IP) access connectivity, comprising:

means for receiving a request from a mobile device to establish a connection to the wireless communications apparatus;

means for deciding local IP access connectivity can be provided to the mobile device based on a configuration or an indication that the wireless communications apparatus received from a network entity, wherein the configuration indicates whether to provide the local IP access connectivity to the mobile device and the indication indicates that the local IP access connectivity is allowed for the mobile device;

means for using dedicated signaling to notify the mobile device that local IP access connectivity is available to enable access to at least one locally available node; and means for receiving capabilities of the mobile device, wherein the notifying is a function of capabilities of the mobile device.

20. The wireless communications apparatus of claim 19, wherein the means for using dedicated signaling further comprises means for using a radio resource control command, wherein the radio resource control command is an RRCReconfigurationCommand message.

21. A computer program product, comprising:

a non-transitory computer-readable medium comprising:

a first set of codes for causing a computer to receive a connection request from a mobile device;

a second set of codes for causing the computer to determine local IP access connectivity is available for the mobile device based on a configuration or an indication that the computer received from a network entity, wherein the configuration indicates whether to provide the local IP access connectivity to the mobile device and the indication indicates that the local IP access connectivity is allowed for the mobile device;

a third set of codes for causing the computer to convey information related to availability of the local IP access connectivity to enable access to at least one locally available node; and a fourth set of codes for causing the computer to receive capabilities of the mobile device, wherein the conveying is a function of capabilities of the mobile device.

22. At least one processor configured to indicate whether local Internet Protocol (IP) access connectivity is available, comprising:

a first module that receives from a mobile device a connection request;

a second module that obtains a network configuration that indicates local IP access connectivity is available for the mobile device;

a third module that sends over dedicated signaling to the mobile device a notification that the local IP access connectivity is available for the mobile device based on the network configuration to enable access to at least one locally available node; and a fourth module that receives capabilities of the mobile device, wherein the notification is a function of capabilities of the mobile device.

23. The at least one processor of claim 22, further comprising:

a fifth module that receives capabilities of the mobile device, wherein the third module sends the notification as a function of the capabilities of the mobile device.

24. A method for obtaining local Internet Protocol (IP) access capability information, comprising:

receiving from an access point an indication over broadcast common signaling that comprises capability of the access point to provide local IP access connectivity to a mobile device, wherein the local IP access connectivity enables access to at least one locally available node by the mobile device, and wherein the indication is received before the mobile device has connected to the access point; and requesting the local IP access connectivity only when the indication specifies that the access point has the capability to provide the local IP access connectivity.

25. The method of claim 24, wherein the indication is received via an overhead channel.

26. The method of claim 25, wherein the indication comprises a field within system information blocks of the overhead channel.

27. The method of claim 24, further comprising sending a request to establish a connection to the access point, wherein the request to establish the connection to the access point is sent before the indication comprising the capability of the access point to provide the local IP access connectivity is received from the access point.

28. A wireless communications apparatus, comprising:

a memory that retains instructions related to receiving an indication over broadcast common signaling that local IP access connectivity is available for a wireless communications apparatus at an access point, wherein the local IP access connectivity enables access to at least one locally available node, wherein the indication is received before the wireless communications apparatus has connected to the access point, and wherein the instructions are also related to requesting the local IP access connectivity only when the indication specifies that the access point has capability to provide the local IP access connectivity; and a processor, coupled to the memory, configured to execute the instructions retained in the memory.

29. The wireless communications apparatus of claim 28, wherein the indication is received via an overhead channel.

30. The wireless communications apparatus of claim 29, wherein the indication comprises a field within system information blocks of the overhead channel.

31. A wireless communications apparatus configured to obtain local Internet Protocol (IP) access capability information, comprising:

means for receiving an indication over broadcast common signaling that comprises capability of an access point to provide local IP access connectivity for the wireless communications apparatus, wherein the local IP access connectivity enables access to at least one locally available node, and wherein the indication is received before the wireless communications apparatus has connected to the access point; and means for requesting local IP access connectivity only when the indication specifies that the access point has the capability to provide the local IP access connectivity.

32. The wireless communications apparatus of claim 31, wherein the indication is received via an overhead channel.

33. The wireless communications apparatus of claim 32, wherein the indication comprises a field within system information blocks of the overhead channel.

34. A computer program product, comprising:
a non-transitory computer-readable medium comprising:
a first set of codes for causing a computer to receive an indication over broadcast common signaling that an access point can provide local Internet Protocol (IP) access connectivity to the computer, wherein the local IP access connectivity enables access to at least one locally available node, and wherein the indication is received before the computer has connected to the access point; and
a second set of codes for causing the computer to request local IP access connectivity only when the indication specifies that the access point has capability to provide the local IP access connectivity.

35. The computer program product of claim 34, wherein the indication is received via an overhead channel.

36. The computer program product of claim 35, wherein the indication comprises a field within system information blocks of the overhead channel.

37. At least one processor configured to obtain local Internet Protocol (IP) access capability information, comprising:
a first module that requests a connection with an access point;
a second module that receives an indication that the connection is available for a mobile device, wherein the local IP access connectivity enables access to at least one locally available node, and wherein the indication is received before the mobile device has connected to the access point; and
a third module that requests the local IP access connectivity only when the indication specifies that the access point has capability to provide the local IP access connectivity.

38. The at least one processor of claim 37, wherein the indication is received via an overhead channel.

39. The at least one processor of claim 38, wherein the indication comprises a field within system information blocks of the overhead channel.

40. A method for obtaining local Internet Protocol (IP) access capability information, comprising:
sending a request to establish a connection to an access point;
sending capabilities of a mobile device to the access point; and
receiving from the access point an indication via dedicated signaling, wherein the indication comprises capability of the access point to provide local IP access connectivity to the mobile device, wherein the request to establish the connection to the access point is sent before the indication comprising the capability of the access point to provide the local IP access connectivity is received from the access point, wherein the indication is a function of the capabilities of the mobile device, and wherein the local IP access connectivity enables access to at least one locally available node by the mobile device.

41. The method of claim 40, wherein the dedicated signaling comprises mobile device-specific signaling.

42. The method of claim 40, wherein receiving the indication comprises receiving a radio resource control (RRC) command.

43. The method of claim 42, wherein the RRC command comprises an RRCReconfigurationCommand message.

44. The method of claim 40, further comprising requesting the local IP access connectivity in response to the indication.

45. A wireless communications apparatus, comprising:
a memory that retains instructions related to sending a request to establish a connection to an access point, sending capabilities of a mobile device to the access point, and receiving from the access point an indication via dedicated signaling, wherein the indication comprises capability of the access point to provide local IP access connectivity to the mobile device, wherein the request to establish the connection to the access point is sent before the indication comprising the capability of the access point to provide the local IP access connectivity is received from the access point, wherein the indication is a function of the capabilities of the mobile device, and wherein the local IP access connectivity enables access to at least one locally available node by the mobile device; and
a processor, coupled to the memory, configured to execute the instructions retained in the memory.

46. The wireless communications apparatus of claim 45, wherein the dedicated signaling comprises mobile device-specific signaling.

47. The wireless communications apparatus of claim 45, wherein receiving the indication comprises receiving a radio resource control (RRC) command.

48. The wireless communications apparatus of claim 47, wherein the RRC command comprises an RRCReconfigurationCommand message.

49. The wireless communications apparatus of claim 45, wherein the instructions are also related to requesting the local IP access connectivity in response to the indication.

50. A wireless communications apparatus configured to obtain local Internet Protocol (IP) access capability information, comprising:
means for sending a request to establish a connection to an access point;
means for sending capabilities of a mobile device to the access point; and
means for receiving from the access point an indication via dedicated signaling, wherein the indication comprises capability of the access point to provide local IP access connectivity to the mobile device, wherein the request to establish the connection to the access point is sent before the indication comprising the capability of the access point to provide the local IP access connectivity is received from the access point, wherein the indication is a function of the capabilities of the mobile device, and wherein the local IP access connectivity enables access to at least one locally available node by the mobile device.

51. The wireless communications apparatus of claim 50, wherein the dedicated signaling comprises mobile device-specific signaling.

52. The wireless communications apparatus of claim 50, wherein the means for receiving the indication comprises means for receiving a radio resource control (RRC) command.

53. The wireless communications apparatus of claim 52, wherein the RRC command comprises an RRCReconfigurationCommand message.

54. The wireless communications apparatus of claim 50, further comprising means for requesting the local IP access connectivity in response to the indication.

55. A computer program product, comprising:
a non-transitory computer-readable medium comprising:
a first set of codes for causing a computer to send a request to establish a connection to an access point;
a second set of codes for causing the computer to send capabilities of a mobile device to the access point; and
a third set of codes for causing the computer to receive from the access point an indication via dedicated signaling, wherein the indication comprises capability of the access point to provide local IP access connectivity to the mobile device, wherein the request to establish the connection to the access point is sent before the indication comprising the capability of the access point to provide the local IP access connectivity is received from the access point, wherein the indication is a function of the capabilities of the mobile device, and wherein the local IP access connectivity enables access to at least one locally available node by the mobile device.

56. The computer program product of claim 55, wherein the dedicated signaling comprises mobile device-specific signaling.

57. The computer program product of claim 55, wherein receiving the indication comprises receiving a radio resource control (RRC) command.

58. The computer program product of claim 57, wherein the RRC command comprises an RRCReconfigurationCommand message.

59. The computer program product of claim 55, further comprising a fourth set of codes for causing the computer to request the local IP access connectivity in response to the indication.

60. At least one processor configured to obtain local Internet Protocol (IP) access capability information, comprising:
a first module that sends a request to establish a connection to an access point;
a second module that sends capabilities of a mobile device to the access point; and
a third module that receives from the access point an indication via dedicated signaling, wherein the indication comprises capability of the access point to provide local IP access connectivity to the mobile device, wherein the request to establish the connection to the access point is sent before the indication comprising the capability of the access point to provide the local IP access connectivity is received from the access point, wherein the indication is a function of the capabilities of the mobile device, and wherein the local IP access connectivity enables access to at least one locally available node by the mobile device.

61. The at least one processor of claim 60, wherein the dedicated signaling comprises mobile device-specific signaling.

62. The at least one processor of claim 60, wherein receiving the indication comprises receiving a radio resource control (RRC) command.

63. The at least one processor of claim 62, wherein the RRC command comprises an RRCReconfigurationCommand message.

64. The at least one processor of claim 60, further comprising a fourth module that requests the local IP access connectivity in response to the indication.

* * * * *